United States Patent [19]
Song

[11] Patent Number: 5,305,095
[45] Date of Patent: Apr. 19, 1994

[54] METHOD AND CIRCUIT FOR ENCODING COLOR TELEVISION SIGNAL

[75] Inventor: Tong-Ill Song, Suwon, Rep. of Korea

[73] Assignee: SamSung Electronics Co., Ltd., Suwon, Rep. of Korea

[21] Appl. No.: 55,253

[22] Filed: May 3, 1993

Related U.S. Application Data

[63] Continuation-in-part of Ser. No. 631,995, Dec. 21, 1990, Pat. No. 5,208,662.

[30] Foreign Application Priority Data

Dec. 22, 1989 [KR] Rep. of Korea ............... 19320/1989

[51] Int. Cl.[5] .................. H04N 9/78; H04N 9/67; H04N 9/77
[52] U.S. Cl. .................. 348/665; 348/493; 348/659; 348/624
[58] Field of Search .................. 358/12, 16, 27, 30, 358/31, 32, 36, 105, 40; H04N 9/67, 9/78, 9/77

[56] References Cited

U.S. PATENT DOCUMENTS

| | | | |
|---|---|---|---|
| 4,683,490 | 7/1987 | Strolle et al. | 358/30 |
| 4,953,032 | 8/1990 | Suzaki et al. | 358/105 |
| 5,063,438 | 11/1991 | Faroudja | 358/31 |
| 5,140,410 | 8/1992 | Shin | 358/31 |
| 5,146,318 | 9/1992 | Ishizuka et al. | 358/31 |
| 5,208,662 | 5/1993 | Song | 358/40 |

Primary Examiner—James J. Groody
Assistant Examiner—Safet Metjahic
Attorney, Agent, or Firm—Robert E. Bushnell

[57] ABSTRACT

An encoding apparatus and method for encoding color television signals which improves the quality of a display image by selecting the most effective passband of a motion and pattern adaptive 3-D filter according to the shape of a pattern or the still and motion image signals, which prevents mixing of a luminance signal and a chrominance signal at an encoding site to obtain the highest resolution for the display image.

17 Claims, 12 Drawing Sheets

METHOD AND CIRCUIT FOR ENCODING COLOR TELEVISION SIGNAL

CROSS REFERENCE TO RELATED APPLICATION

This application makes reference to and claims the benefits arising under 35 U.S.C. §§119 and 120 as a continuation-in-part of a co-pending application filed in the United States Patent & Trademark Office on Dec. 21, 1990 and duly assigned Ser. No. 07/631,995, and subsequently issued as U.S. Pat. No. 5,208,662 on May 4, 1993, and assigned to the assignee of the present application, and an application filed in the Korea Industrial Property Office on Dec. 22, 1989 and assigned Ser. No. 1989/19320.

BACKGROUND OF THE INVENTION

1. Field of the Invention

The present invention relates to a circuit for encoding a composite image signal by synthesizing the composite image signal, especially for use in a television, and more particularly to a circuit and method for encoding a color television signal, which improves resolution of the display image and removes interference between a chrominance signal and a luminance signal by prefiltering with a pattern and motion adaptive variable bandwidth filter.

2. Background Art

Recently, digital signal processing techniques have been employed more frequently as a way to improve the quality of an image signal. Especially, in an IDTV (Improved Definition TV) and EDTV (Enhanced Definition TV) scheme, a motion adaptive signal processing technique has been used as a digital filter that separates a chrominance signal and a luminance signal, and a scanning line conversion circuit may be used to convert an interlaced scanning image signal with 525 scanning lines into a non-interlaced scanning image signal. By using the method stated above for a television receiver, it is possible to improve the resolution of the display image by efficiently removing cross luminance components which occur when a chrominance signal is mixed with a luminance signal, and cross color components which occur when a luminance signal is mixed with a chrominance signal.

A prior art device for achieving the improvements as stated above is shown in FIG. 1, wherein a luminance signal Y and the color difference signals R−Y (I) and B−Y (Q) are separated, respectively, from the red (R), green (G), and blue (B) color signals which are applied to a gamma correction matrix 4. The color difference signals I, Q are filtered by the corresponding low pass filters 10, 11 and modulated by a quadrature phase modulator 5 according to a chrominance sub-carrier signal 1 and a burst flag signal 2.

The signal output from the quadrature phase modulator 5 and the luminance signal Y from the gamma correction matrix 4 are combined at a mixer 6 according to an input signal 3 which is a synchronous and blocking pedestal signal. To obtain a resulting encoded video signal CV, the combined signal output from the mixer 6 is low-pass-filtered by the low pass filter 8.

Since the stated prior art is not a fundamental processing method which removes the cross luminance components from the luminance signal and the chrominance signal, low low quality resolution of the display image and interference of the image due to the cross luminance components from the chrominance signal and the luminance signal often follow.

SUMMARY OF THE INVENTION

It is therefore an object of the present invention to provide an improved circuit and method for encoding a composite image signal.

It is another object to provide an improved circuit and method for synthesizing a composite image signal.

It is still another object to provide a circuit and method for enhancing resolution of a visual display image.

It is yet another object to provide a circuit and method for removing interference between chrominance and luminance signals.

It is still yet another object to provide a circuit and method of improving the quality of a display image at a receiving site by selecting the most effective bandwidth of the filters according to the shape of a pattern or the still and motion image signals, while elevating the resolution of the display image by using a motion and pattern adaptive three dimensional filter, which prevents mixing of a luminance signal and a chrominance signal at an encoding site while sustaining the best resolution.

To achieve the above and other objects of the present invention, the frequency zones of a vertical, horizontal, and temporal axes in a three dimensional filter are adjusted according to a motion signal detected on the basis of an intrafield image signal pattern and a frame difference signal so as to reduce interference of a luminance signal and chrominance signal and to use an image frequency zone effectively during encoding of red (R), green (G), and blue (B) color signals which may be provided from, for example, a camera into a composite image signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
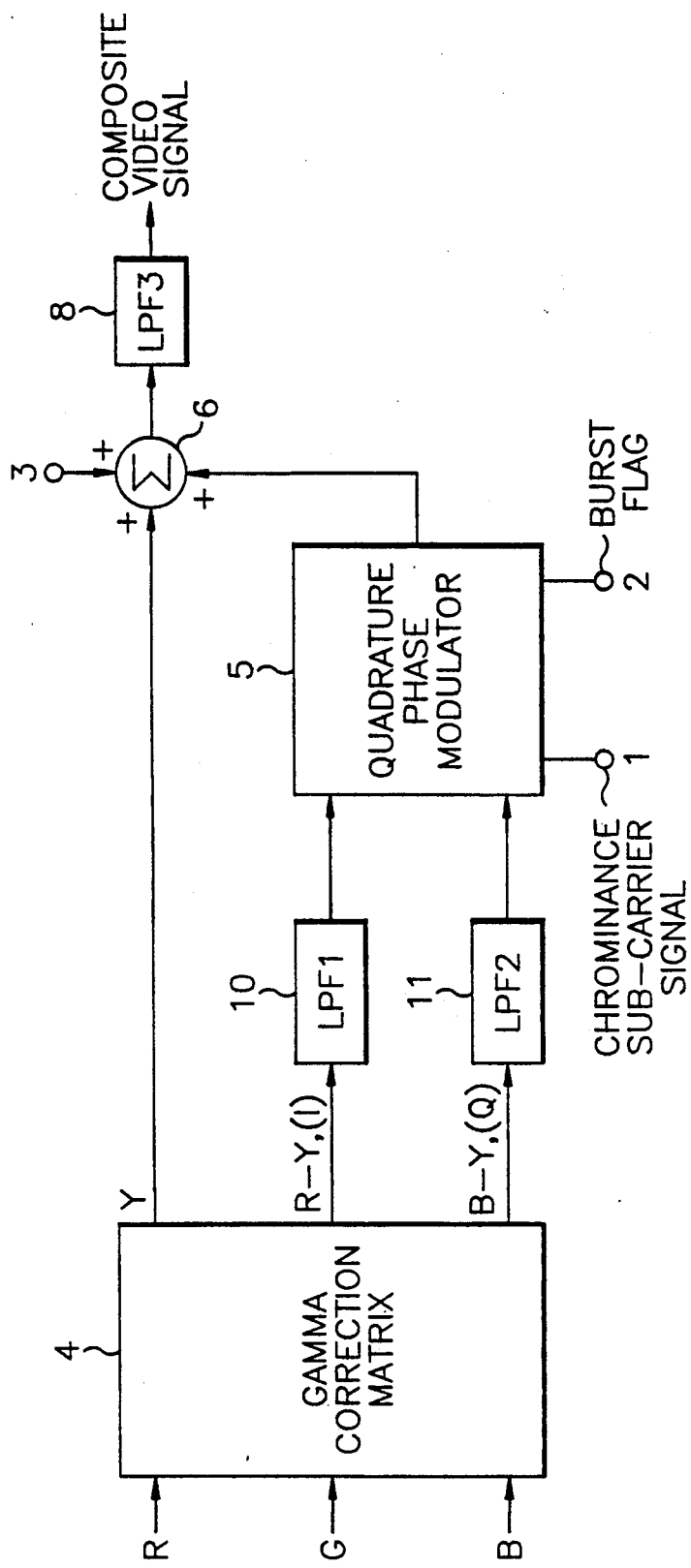
FIG. 1 shows an encoding circuit of the prior art.
Figure 2:
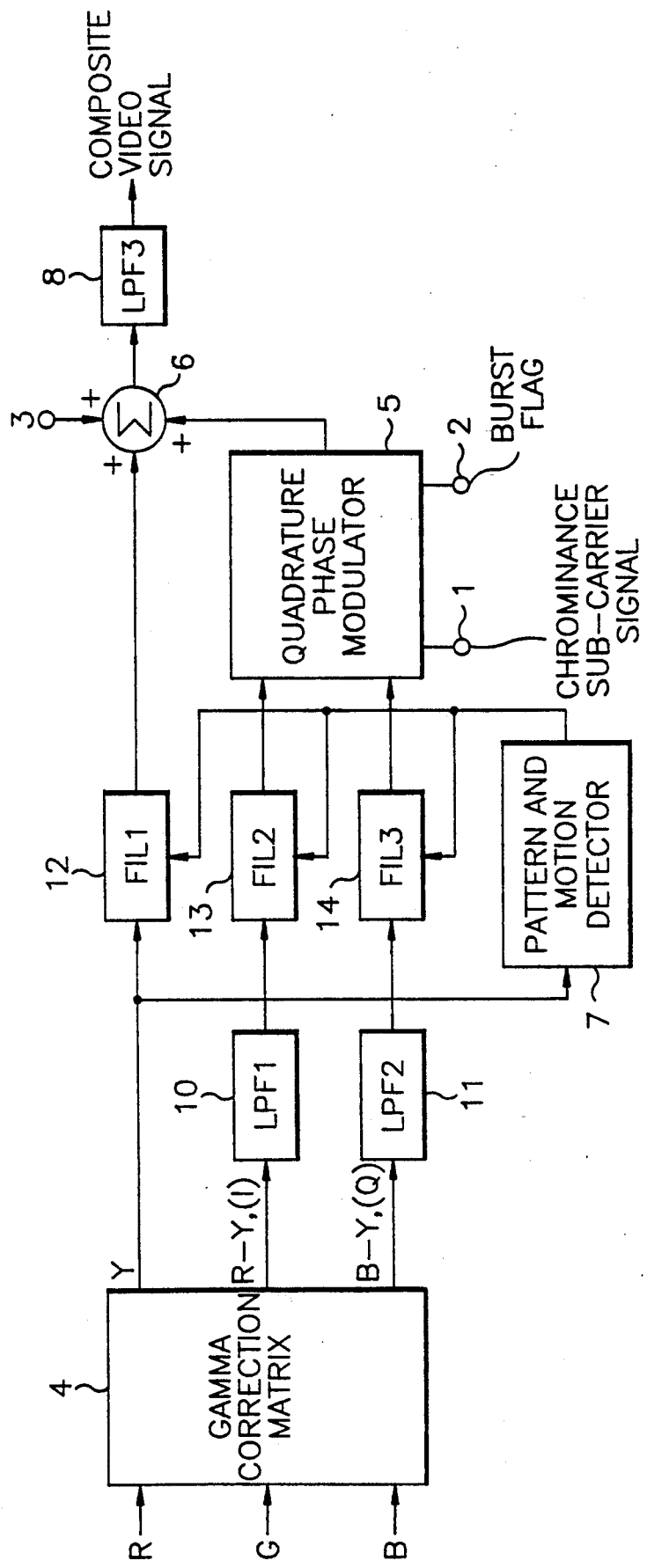
FIG. 2 shows one embodiment of a circuit for encoding color television signals according to the principles of the present invention.

Turning now to the drawings, and referring to FIG. 2, wherein like reference numerals and symbols represent like construction and function of the same elements in FIG. 1, low pass filters 10, 11 are connected to a gamma correction matrix 4, and a signal output from a quadrature phase modulator 5 is combined with a luminance signal Y at a mixer 6. Then, the combined signal is low-pass-filtered at a low pass filter 8.

Continuing in more detail, the luminance signal Y is separated from the red (R), green (G), and blue (B) color signals by the gamma correction matrix 4 and is applied to an input terminal of a first filter 12. The color difference signals R−Y (I) and B−Y (Q) separated by the gamma correction matrix 4 are respectively connected to input terminals of low pass filters 10 and 11, and the outputs from the low pass filters 10 and 11 are respectively connected to input terminals of a second filter 13 and a third filter 14. The luminance signal Y also is connected to a pattern and motion detecting circuit 7 to detect a pattern and motion of the luminance signal Y. The signal output from the pattern and motion detecting circuit 7 is applied to first, second and third filters 12-14. The signal output from the first filter 12 is connected to a mixer 6, and the signal output from the second filter 13 and the third filter 14 are applied to a quadrature phase modulator 5.

Figure 3:
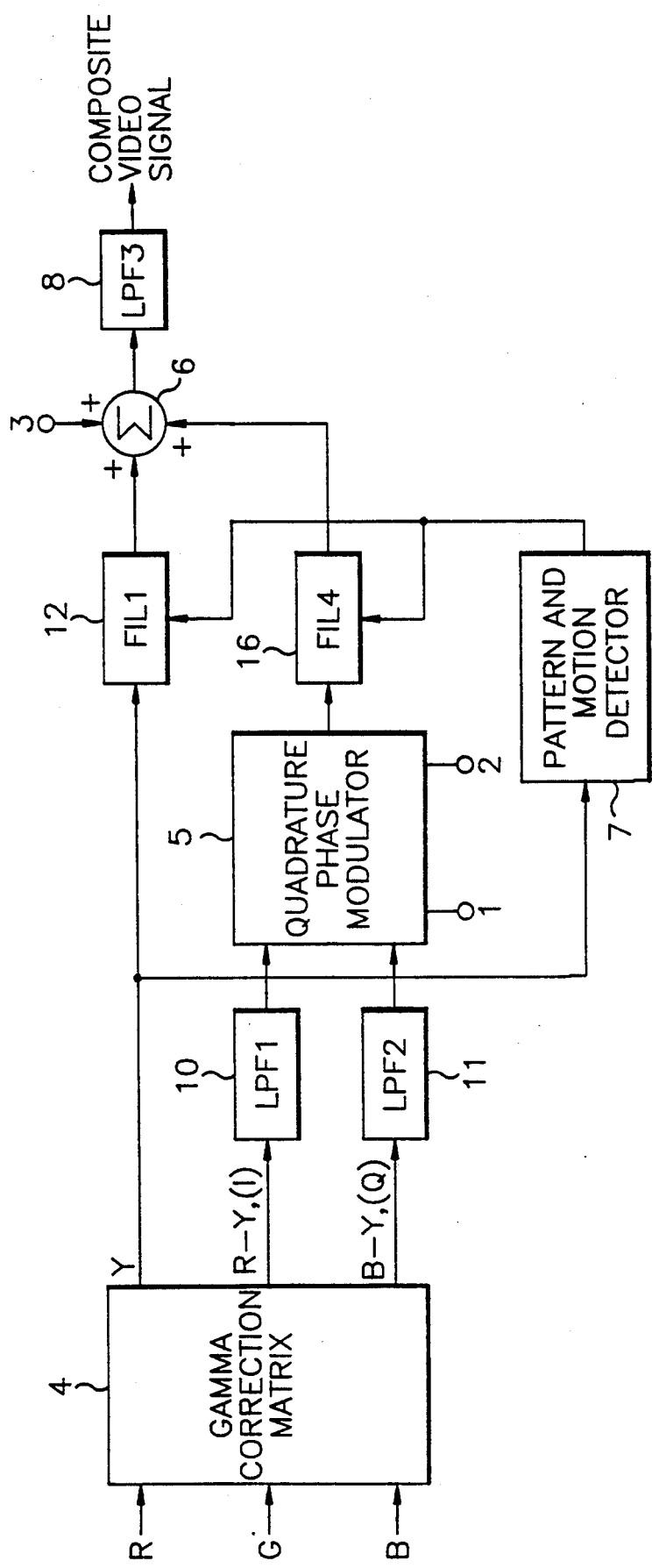
FIG. 3 shows another embodiment of a circuit for encoding color television signal according to the principles of the present invention.

FIG. 3 is another embodiment of a circuit for encoding color television signal according to the present invention in which similar numerals are used to refer to the gamma correction matrix 4, the low pass filters 10 and 11, mixer 6, the low pass filter 8, and the quadrature phase modulator 5. In the circuit shown in FIG. 3, the luminance signal Y from the gamma correction matrix 4 is input into a first filter 12, and a pattern and motion detecting circuit 7. The color difference signals R−Y (I) and B−Y (Q) are input into the quadrature phase modulator 5 through the first and and second low-pass filters 10 and 11, and the signal output from the quadrature phase modulator 5 is input into an input terminal of a fourth filter 16. The signal output of the pattern and motion detecting circuit 7 is applied into the first and the fourth filters 12, 16, and the signals outputs from the first filter 12 and the fourth filter 16 are input into mixer 6.

Figure 4:
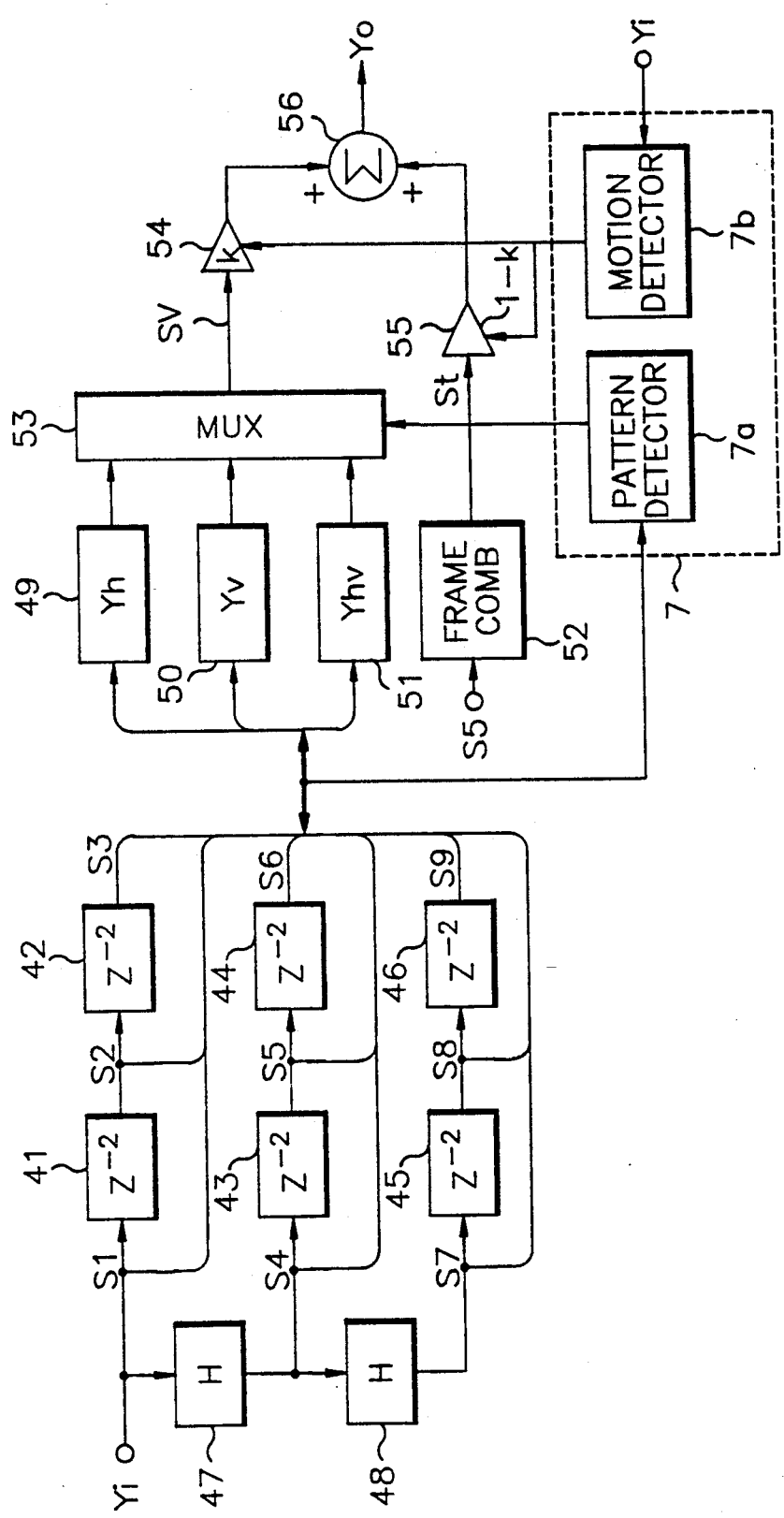
FIG. 4 is a detailed circuit diagram of the first, second and third filters 12-14 of FIG. 2 and the first filter 12 shown in FIG. 3, as constructed according to the principles of the present invention.
Figure 10:
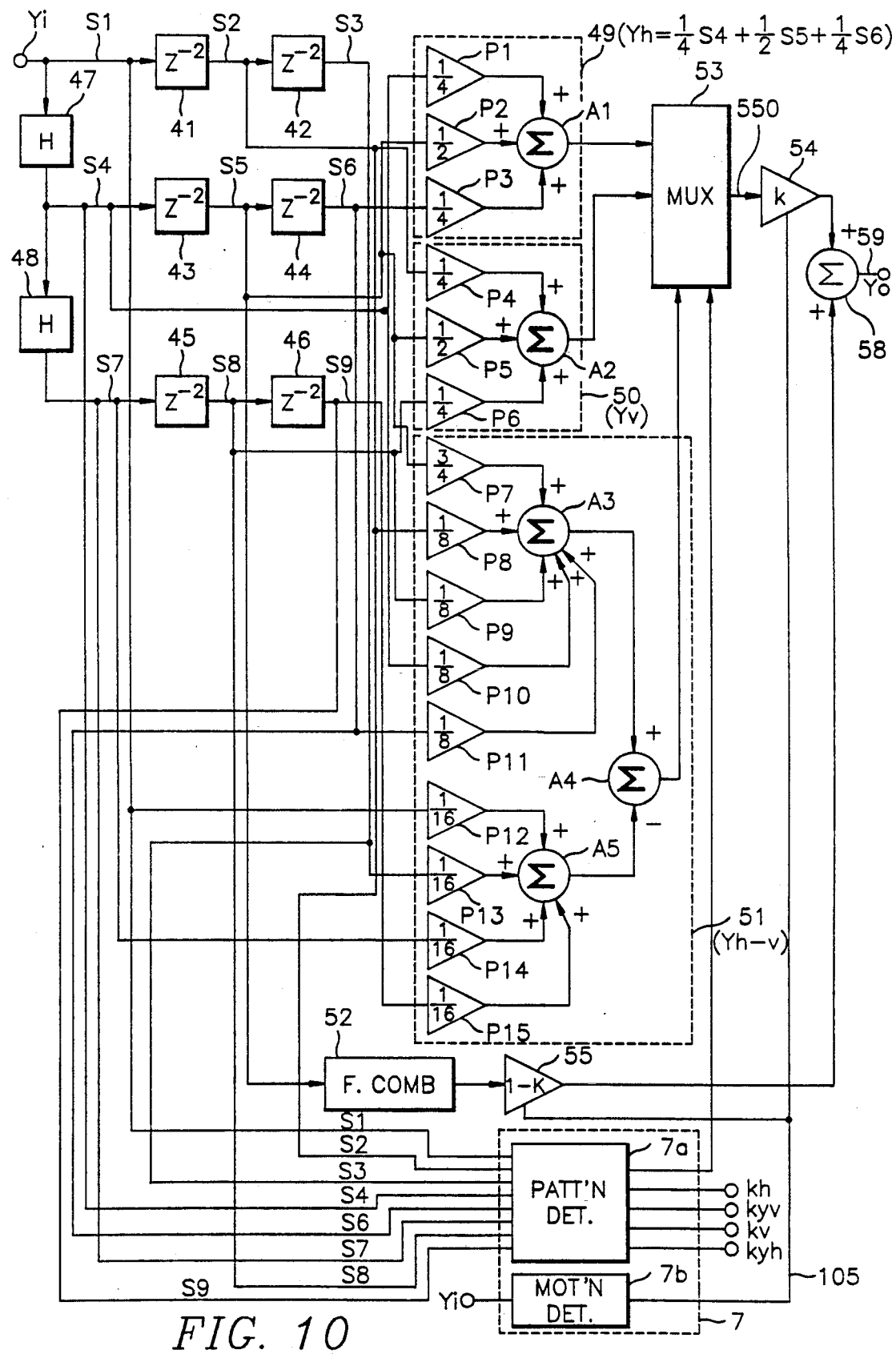
FIG. 10 illustrates in detail, one implementation of the filter represented by FIG. 4.

FIG. 4 is a block diagram of first, second and third filters 12, 13, 14 while FIG. 10 is a detailed circuit diagram of the first, second and third filters 12-14 in FIG. 2 and first and fourth filters 12, 16 in FIG. 3. In FIG. 4, first and second clock delay circuits 41, 42 are coupled in series and are connected to a luminance input terminal $Y_i$. A first horizontal delay circuit 47 also is connected to the luminance input terminal $Y_i$. The output of the first horizontal delay circuit 47 is serially coupled to a third clock delay circuit 43 and a fourth clock delay circuit 44. A second horizontal delay circuit 48 is connected to the first horizontal delay circuit 47, and the output of the second horizontal delay circuit 48 is serially coupled to a fifth clock delay circuit 45 and a sixth clock delay circuit 46.

Referring to FIG. 10, horizontal filter 49 has weighed multipliers P1, P2 and P3 respectively connected to receive an output $S_4$ from the first horizontal delay circuit 47 and outputs $S_5$ and $S_6$ from the third and fourth clock delay circuits 43, 44. The resulting signals output from multiplier P1, which divides output $S_4$ by four, multiplier P2, which divides output $S_5$ by two, and multiplier P3, which divides $S_6$ by four, are added by adder A1, to provide:

$$Y_h = \left[ \frac{S4}{4} + \frac{S5}{2} + \frac{S6}{4} \right] \tag{1}$$

A vertical filter 50 has weighed multipliers P4, P5 and P6 respectively connected to receive outputs $S_2$, $S_5$, and $S_8$ from the first, third, and fifth clock delay circuits 41, 43, and 45, respectively. The resulting signals output from multiplier P4, which divides $S_2$ by four, multiplier P5, which divides $S_5$ by two, and multiplier P6, which divides $S_8$ by four, are added by adder A2, to provide:

$$Y_v = \left[ \frac{S2}{4} + \frac{S5}{2} + \frac{S8}{4} \right] \tag{2}$$

A horizontal-vertical filter 51 has weighed multipliers P10 and P14 respectively connected to outputs $S_4$ and $S_7$ from the first and the second horizontal delay circuits 47 and 48, and weighed multipliers P8, P13, P7, P11, P9 and P15 respectively connected to receive outputs $S_2$, $S_3$, $S_5$, $S_6$, $S_8$, and $S_9$ from the first through sixth clock delay circuits 41-46. The resulting signals output from multiplier P12, which divides S1 by sixteen from multiplier P13, which divides S3 by sixteen, from P14, which divides S7 by sixteen and P15, which divides S9 by sixteen, are added by an adder A5. The resulting signals output from multiplier P4, which multiplies S5 by three-quarters, P8, which divides S2 by one-eighth, P9, which divides S8 by one-eighth, P10, which divides S4 by one-eighth, and P11, which divides S6 by one-eighth, are added by adder A3. Adder A4 subtracts the output from adder A5 from the output of adder A3 to provide:

$$Y_{hv} = \left[ \frac{3S5}{4} + \frac{S2}{8} + \frac{S8}{8} + \frac{S4}{8} + \frac{S6}{8} \right] - \left[ \frac{S1}{16} + \frac{S3}{16} + \frac{S7}{16} + \frac{S9}{16} \right] \tag{3}$$

A multiplexer 53 selects an output from one of the vertical, horizontal, and horizontal-vertical filters 49, 50 or 51 according to an output signal from pattern detector 7a. A gain controller 55 takes an output from a frame comb filter 52 as an input to delay the input signal from the output $S_5$ of third clock delay circuit 43 by a frame unit, and a mixer 56 outputs a mixed gain-controlled signal that is gain-controlled by the gain controllers 54 and 55 according to an output signal from the motion detector 7b.

Figure 5A:
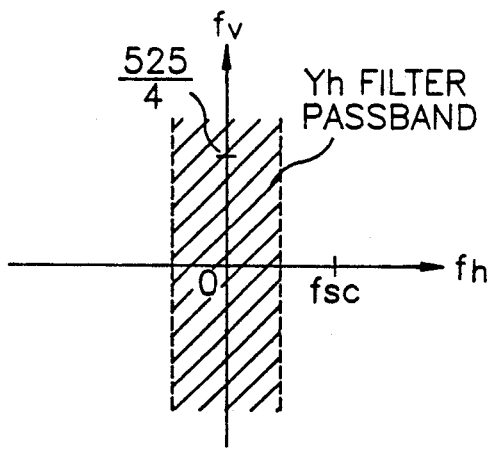
FIGS. 5A through 5C are spatial frequency zone selecting characteristics of vertical, horizontal, and horizontal-vertical filters 49-51 of FIG. 4 respectively, constructed according to the principles of the present invention.
Figure 5B:
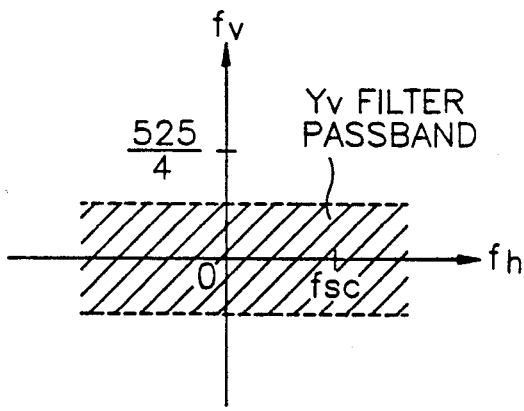
Figure 5C:
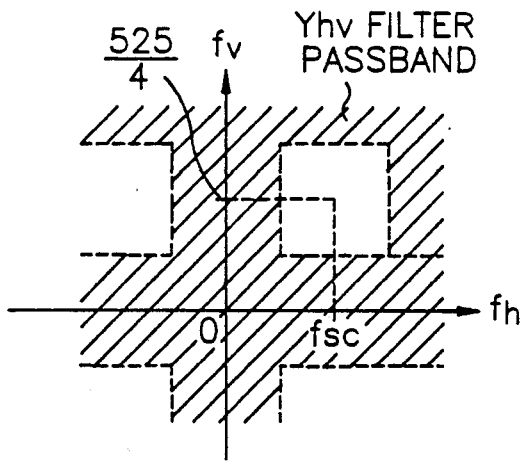

FIGS. 5A through 5C show the spatial frequency zone selecting characteristics of the horizontal filter 49, the vertical filter 50, and the horizontal-vertical filter 51 in FIGS. 4A and 4B according to the present invention. FIG. 5A shows the frequency selecting characteristics of the horizontal filter 49; FIG. 5B shows the frequency selecting characteristics of the vertical filter 50; and FIG. 5C shows the frequency selecting characteristics of the horizontal-vertical filter 51.

Figure 6:
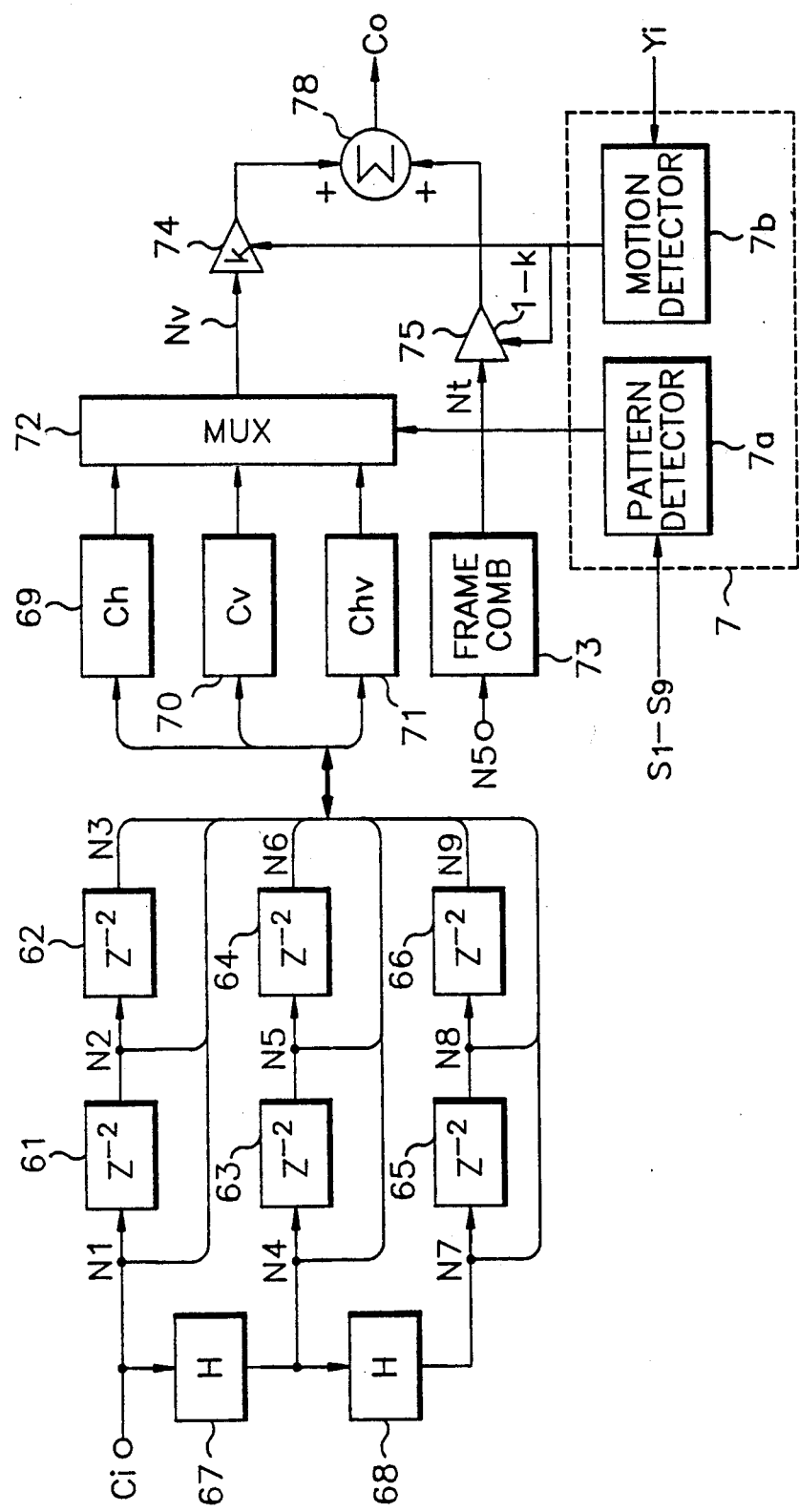
FIG. 6 shows a detailed circuit diagram of the fourth filter 16 of FIG. 3 according to the present invention.

FIG. 6 is an embodiment of a specific circuit diagram of the fourth filter 16 in FIG. 3 according to the invention, wherein the reference numerals 67 and 68 represent horizontal delay circuits; reference numerals 61 through 66 represent clock delay circuits; reference numeral 69 represents a horizontal filter; reference numeral 70 represents a vertical filter; reference numeral 71 represents a horizontal-vertical filter; reference numeral 72 represents a multiplexer; and reference numerals 74 and 75 represent gain controllers, having the same connection as shown in FIGS. 4. Frame comb filter 73 has an input port coupled between clock delay circuit 63, 64 to receive signal N5, and an output port coupled to provide signal Nt to gain controller 75.

Figure 11:
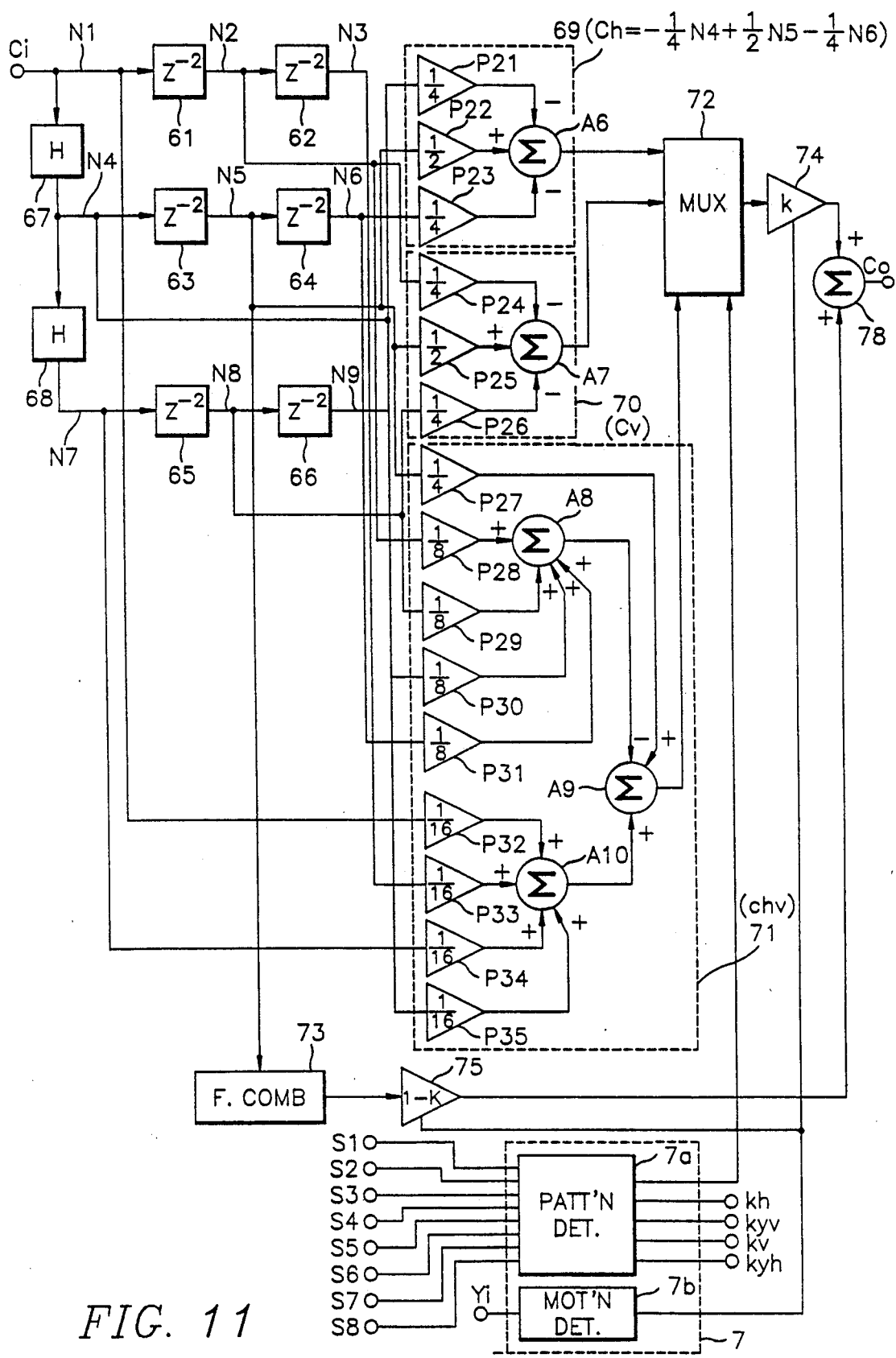
FIG. 11 illustrates in detail, one implementation of the filter represented by FIG. 6.

Referring now to FIG. 11, horizontal filter 69 has weighed multiplier P21 coupled to divide output N4 from horizontal delay circuit 67 by four, weighed multiplier P22 coupled to divide output N5 from clock delay circuit 63 by two, and weighed multiplier P23 coupled to divide output N6 from clock delay circuit 64 by four. The resulting signals from multipliers P21, P22 and P23 are combined by adder A6 to provide:

$$C_h = \frac{N4}{4} + \frac{N5}{2} - \frac{N6}{4} \quad (4)$$

Vertical filter 70 has weighted multiplier P24 coupled to divide signal N2 from clock delay circuit 61 by four, multiplier P25 coupled to divide signal N5 from clock delay circuit 63 by two, and to multiplier P26 coupled to divide signal N8 from clock delay circuit 65 by four. The resulting signals from multipliers P24, P25 and P26 are combined by adder A7 to provide:

$$C_v = \left[ \frac{N5}{2} - \frac{N2}{4} - \frac{N8}{4} \right] \quad (5)$$

Horizontal-vertical filter 71 has weighed multiplier P27 coupled to divide signal N5 by four, weighed multiplier P28 coupled to divide signal N2 by eight, weighed multiplier P29 coupled to divide signal N8 by eight, multiplier P30 coupled to divide signal N4 by eight, multiplier P31 coupled to divide signal N6 by eight, multiplier P32 coupled to divide signal N1 by sixteen, multiplier P33 coupled to divide signal N3 by sixteen, multiplier P34 coupled to divide signal N7 by sixteen, and multiplier P35 coupled to divide signal N9 by sixteen. Adders A8, A9 and A10 are configured to combine the resulting signals from weighed multipliers P21-P35, to provide:

$$C_{hv} = \frac{N5}{4} - \left[ \frac{N2}{4} + \frac{N8}{8} + \frac{N4}{8} + \frac{N6}{8} \right] + \quad (6)$$

$$\left[ \frac{N1}{16} + \frac{N3}{16} + \frac{N7}{16} + \frac{N9}{16} \right]$$

Figure 7A:
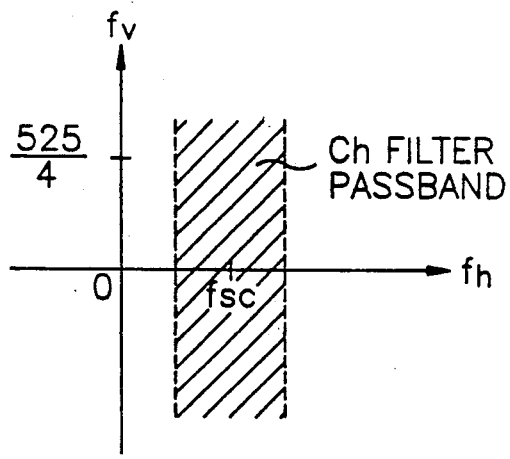
FIGS. 7A through 7C are views of spatial frequency zone selecting characteristics of the horizontal, vertical and horizontal-vertical filters 69-71 of FIG. 6 respectively, constructed according to the present invention.
Figure 7B:
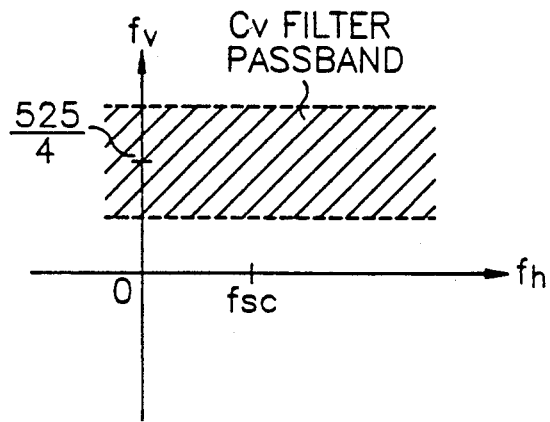
Figure 7C:
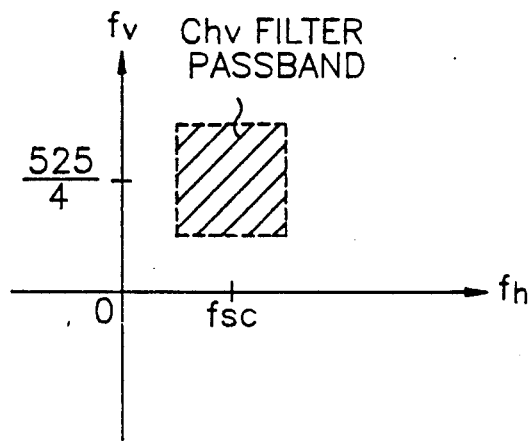

FIGS. 7A, 7B and 7C respectively illustrate the spatial frequency zone selecting characteristics of the vertical, horizontal, and horizontal-vertical filters 69, 70 and 71 in FIG. 6, constructed according to the principles of the present invention.

Figure 8:
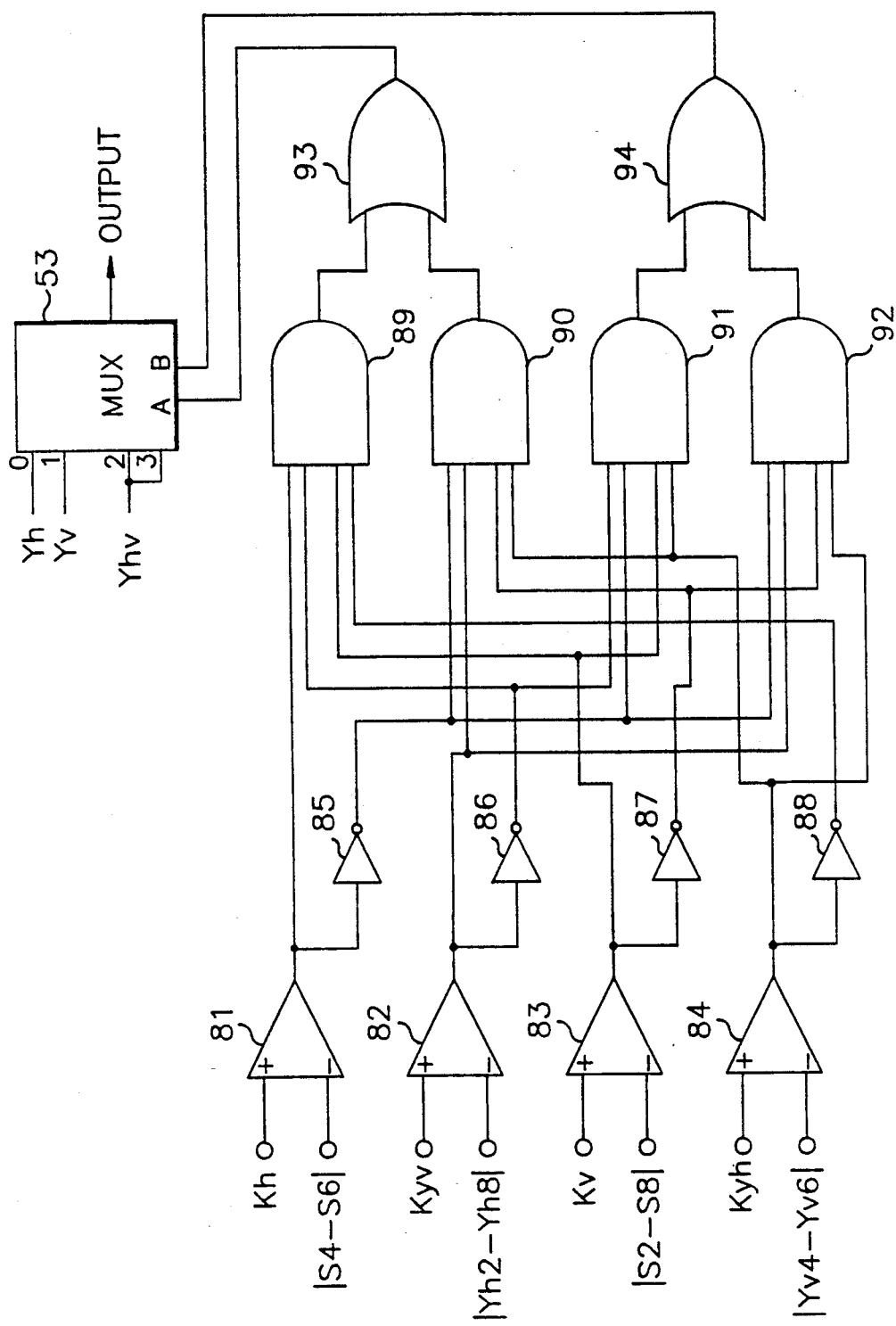
FIG. 8 shows a detailed circuit diagram of the pattern detecting circuit 7a of FIGS. 2, 3, 4 and 6 constructed according to the principles of the present invention.

FIG. 8 is a more detailed diagram of the pattern detector 7a shown in FIGS. 4 and 6 constructed according to present invention. The signals $Y_h$, $Y_v$ and $Y_{hv}$ each are the output from the horizontal filter 49, the vertical filter 50 and the horizontal-vertical filter 51, respectively. The signals $Y_{h2}$, $Y_{h8}$, $Y_{v4}$ and $Y_{v6}$ each define a combined horizontal or vertical luminance signal obtained from application of the following formulae to the various intermediate outputs of the input luminance signals delayed by two clocks, as shown in FIG. 4, wherein:

$$Y_{h2} = \frac{S_1 + 2S_2 + S_3}{4} \quad (7)$$

$$Y_{h8} = \frac{S_7 + 2S_8 + S_9}{4} \quad (8)$$

$$Y_{v4} = \frac{S_1 + 2S_4 + S_7}{4} \quad (9)$$

$$Y_{v6} = \frac{S_3 + 2S_6 + S_9}{4} \quad (10)$$

In the pattern detecting circuit 7a illustrated in detail in FIG. 8, comparators 81, 82, 83 and 84 compare the output signals from the first and second horizontal delay circuits 47, 48 and the first through sixth clock delay circuits 41–46 with a plurality of threshold voltages $K_h$, $K_{yv}$, $K_v$ and $K_{yh}$. Inverters 85, 86, 87 and 88 invert the output signals from comparators 81, 82, 83 and 84, respectively, and the selection signals to be provided to the selection terminals A and B of multiplexer 53 are generated by AND gates 89, 90, 91 and 92 and OR gates 93, 94, which perform a specific logic combination for the signals output from comparators 81, 82, 83 and 84 and inverters 85, 86, 87 and 88. Multiplexer 53 selects one of the output signals $Y_h$, $Y_v$ and $Y_{hv}$ in accordance with the selection signals applied to the selection terminals A and B of multiplexer 53 in order to provide a pattern value signal.

Figure 9:
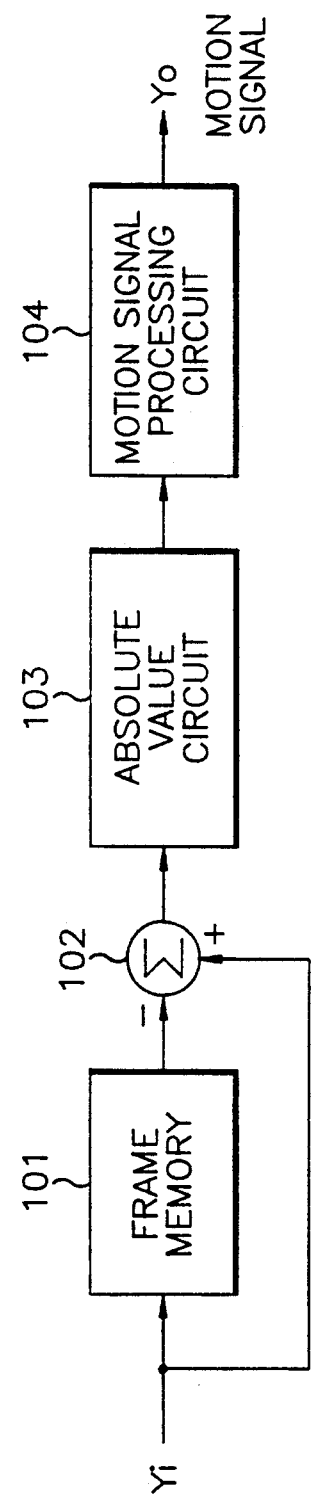
FIG. 9 shows a detailed circuit diagram of the motion detecting circuit 7b of FIGS. 2, 3, 4 and 6 constructed according to the present invention.

FIG. 9 is a detailed circuit diagram of the motion detector 7b as shown in FIGS. 4 and 6, in which a frame memory 101 delays the luminance signal input $Y_i$ by one frame, and a subtractor 102 subtracts the output from the frame memory 101 from the luminance signal input $Y_i$. Then, an absolute value circuit 103 converts the output from the subtractor 102 to its absolute value. A motion signal processing circuit 104 then processes the output from the absolute value circuit 103 to provide a motion signal.

Referring now collectively to FIGS. 2 through 11, the operations of the foregoing embodiment of the present invention will be discussed. First, and with reference to an operating effect of the first filter 12, in the event that there is no edge in a horizontal direction (the horizontal correlation is high), that is $|S_4-S_6| \leq K_h$ and $|Y_{h2}-Y_{h8}| \geq K_{yv}$ for the luminance signal Y. In addition, the multiplexer 53 in FIG. 4 selects the output from the horizontal filter, i.e., $Y_h=0.25(S_4)+0.5(S_5)+0.25(S_6)$, if an edge in a vertical direction is detected. In this case, the selecting characteristics in the spatial frequency zone is the same as shown in FIG. 5A. Here, the fact that there is no edge in the horizontal direction means a signal spectrum is distributed to a lower zone of a horizontal frequency direction. On the other hand, when there is an edge in the vertical direction, higher frequency components in the signal spectrum are contained in a vertical direction. Therefore, a filter which has the characteristics as shown in FIG. 5A is adequate.

In case where $|S_2-S_8|\leq K_v$ and $|Y_{v4}-Y_{v6}|\geq K_{yh}$, there is no edge in the vertical direction (the vertical correlation is high), but there is an edge in a horizontal direction, and the multiplexer 53 in FIG. 4 selects an output from the vertical filter 50. Thus, $Y_v=0.25(S_2)+0.5(S_5)+0.25(S_8)$. In this case, the selecting characteristics in the spatial frequency zone is the same as shown in FIG. 5B. Here, the fact that there is no edge in the vertical direction means a signal spectrum is distributed to a lower zone of a vertical frequency direction. On the other hand, if there is an edge in the horizontal direction, higher frequency components in the signal spectrum are contained in a horizontal direction. Therefore, a filter which has the characteristics as shown in FIG. 5B is adequate.

In case where $|S_2-S_8|\leq K_v$ and $|Y_{v4}-Y_{v6}|\geq K_{yh}$, and $|S_4-S_6|\leq K_h$ and $|S_2-S_8|\leq K_v$, the multiplexer 53 in FIGS. 4 and 10 selects an output from the horizontal-vertical filter 51. Thus, $Y_{hv}=\frac{3}{4}(S_5)+\frac{1}{8}(S_2+S_8+S_4+S_6)-1/16(S_1+S_3+S_7+S_9)$. In this case, the selection characteristics in the spatial frequency zone is the same as shown in FIG. 5C. Here, it means either that there is no edge in both of the vertical and horizontal directions or there is edge in both of the vertical and horizontal directions.

If there are edges in both directions, the signal spectrum is distributed widely in both vertical and horizontal directions. Thus it is necessary to remove the signal spectrum occupied by a modulated chrominance signal as FIG. 5C to prevent the modulated chrominance signal from an interference. Also, if there is an edge in neither direction, the signal spectrum is distributed in the lower parts of the vertical and horizontal frequency directions, thus the selecting characteristics in the spatial frequency zone as shown in FIG. 5C is adequate.

In addition, the color difference signals I and Q are filtered by the second and third filters which have similar effects to the first filter 12, and are then modulated by the quadrature phase modulator 5. The output signal from the quadrature phase modulator 5 is combined with the output signal from the first filter 12. At this time, a spatial frequency of a chrominance sub-carrier for the quadrature phase modulator 5 is $f_h=f_{sc}$ and $f_v=525/4$ to separate the luminance signal and the modulated chrominance signal.

Referring to the operation of FIG. 3, for the luminance signal Y, it is the same as in FIG. 2, except that for the color difference signals I and Q, a quadrature phase modulation is performed by a well-known method, and the modulated output is filtered by the fourth filter 16 which uses a similar principle as the first filter 12. The output from the fourth filter 16 and the luminance signal Y filtered by the first filter 12 are combined by adder 6 and low pass filtered by filter 8 to form a composite image signal.

In case where $|S_4-S_6|\leq K_h$ and $|Y_{h2}-Y_{h8}|\geq K_{yv}$, multiplexer 72 in FIGS. 6 and 11 selects horizontal filter 69; as represented by Equation (4), $C_h=-\frac{1}{4}(N_4)+\frac{1}{2}(N_5)-\frac{1}{4}(N_6)$. In other words, for the luminance signal Y, there is no edge in a horizontal direction, but there is an edge in a vertical direction. The selecting characteristics of a spatial frequency zone for the horizontal filter 69 is as shown in FIG. 7A.

In case where $|S_2-S_8|\leq K_v$ and $|Y_{v4}-Y_{v6}|\geq K_{yh}$, the multiplexer 72 in FIGS. 6 and 11 selects vertical filter 70; as represented by Equation (5), $C_v=-\frac{1}{4}(N_2)+\frac{1}{2}(N_5)-\frac{1}{4}(N_8)$. In other words, for the luminance signal Y, there is no edge in a vertical direction, but there is an edge in a horizontal direction. The selecting characteristics of a spatial frequency zone for the horizontal filter 70 is as shown in FIG. 7B.

In case where $|Y_{h2}-Y_{h8}|\geq K_{yv}$ and $|Y_{v4}-Y_{v6}|\geq K_{yh}$, and $|S_4-S_6|\leq K_h$ and $|S_2-S_8|\leq K_v$, the multiplexer 72 in FIGS. 6 and 11 selects a horizontal-vertical filter 71; as represented by Equation (6), $C_{hv}=\frac{1}{4}(N_5)-\frac{1}{8}(N_2+N_8+N_4+N_6)+1/16(N_1+N_3+N_7+N_9)$. The selecting characteristics of a spatial frequency zone for the horizontal filter 71 is as shown in FIG. 7C.

A more-detailed diagram of the pattern detecting circuit 7a is shown in FIG. 8. The pattern detecting circuit 7a includes comparators 81, 82, 83 and 84, inverters 85, 86, 87 and 88, AND gates 89, 90, 91 and 92, and OR gates 93, 94. In case where there is no edge in horizontal direction, that is $|S_4-S_6|\leq K_h$, the output signal from the comparator 81 becomes logic high. When there is an edge in the vertical direction, that is $|Y_{h2}-Y_{h8}|\geq K_{yv}$, an output signal from the comparator 82 becomes logic high. Here, as shown by Equation (7), $Y_{h2}=\frac{1}{4}(S_1+2S_2+S_3)$, and by Equation (8), $Y_{h8}=\frac{1}{4}(S_7+2S_8+S_9)$. When there is no edge in a vertical direction, that is $|S_2-S_8|\leq K_v$, the output of the comparator 83 becomes logic high. When there is edge in a horizontal direction, that is $|Y_{v4}-Y_{v6}|\geq K_{yh}$, the output of the comparator 84 becomes logic high. Here, as shown by Equation (9) $Y_{v4}=\frac{1}{4}(S_1+2S_4+S_7)$, and by Equation (10) $Y_{v6}=\frac{1}{4}(S_3+2S_6+S_9)$. The combination signals output from comparators 81, 82, 83 and 84, inverters 85, 86, 87 and 88, the AND gates 89, 90, 91 and 92, and the OR gates 93, 94 are used to select one of the horizontal, vertical, and horizontal-vertical filters 69–73 and 49–51. It is clear that anyone who has general knowledge in this field can easily understand the operating principle represented by FIG. 8.

A more-detailed diagram of the motion detecting circuit 7b is shown in FIG. 9. The current luminance signal Y and the output of the frame memory 101 are used to obtain the frame difference signal between the current frame and a preceding frame, and an absolute value of the frame difference signal is calculated by the absolute value circuit 103. The output of the absolute value circuit 103 is applied to the motion signal processing circuit 104 to obtain in a quantity of motion to control a gain k (where $0<k<1$) of the gain controllers 54, 55, 74 and 75. If the quantity of the motion becomes larger, then the k value becomes larger. Especially, when the k value is identical to 1, the outputs of the filters 49–51 and 69–71 in FIGS. 4, 6, 10 and 11 are equal to the output from the multiplexers 53, 72, and when the k value is zero, the output signals from the filters 49–51 and 69–71 are one-frame-delayed signals. When the k value is between zero and one, the outputs of the filters 49–51 and 69–71 in FIGS. 4 and 6 become $Y_o = k(S_y) + (1-k)S_t$ and $C_o = k(N_y) + (1-k)N_t$, respectively.

Figure 12:
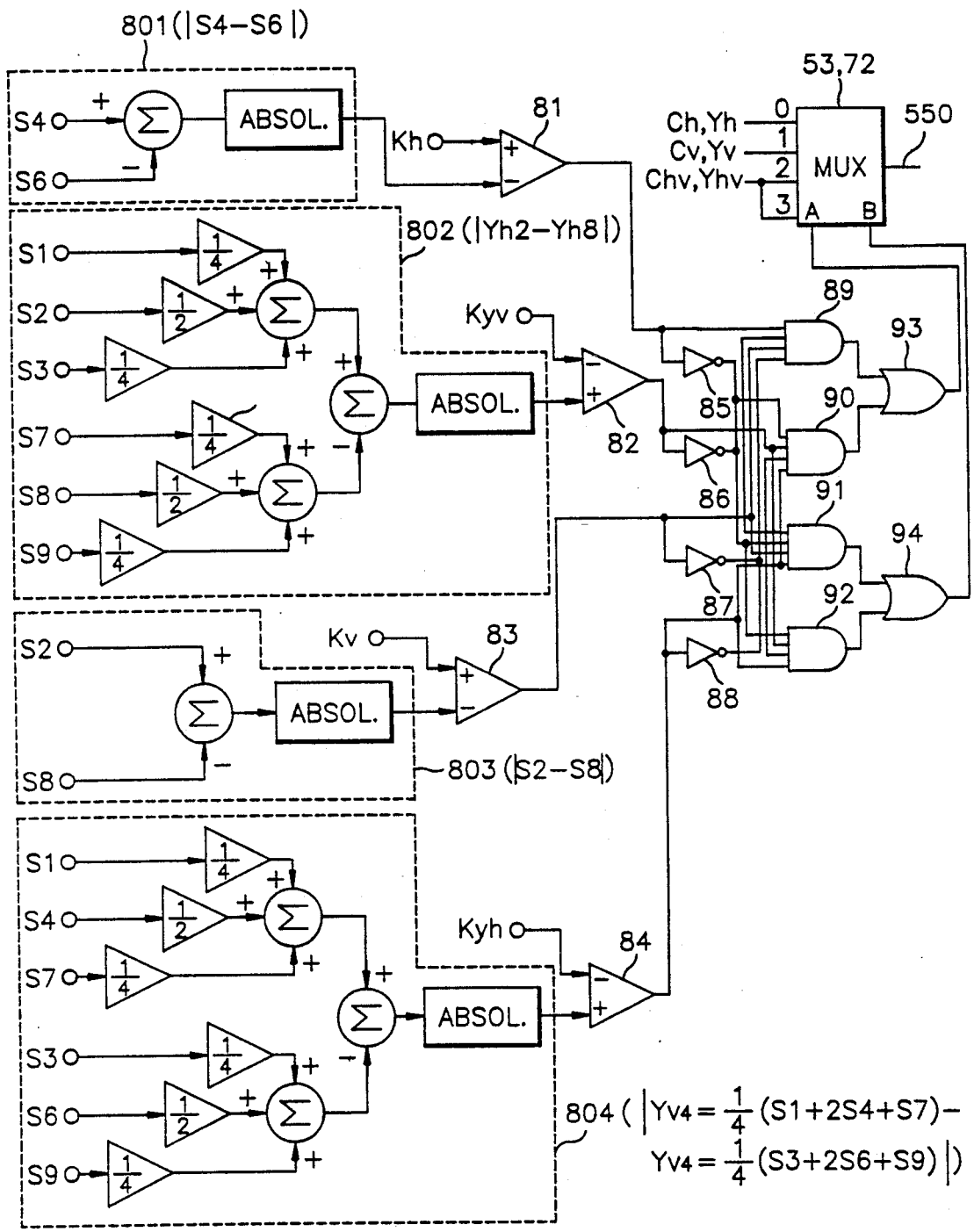
FIG. 12 is a detailed circuit diagram of one implementation of a pattern detector as represented in FIGS. 4, 6, 10 and 11.

Turning briefly to FIG. 12, one implementation of pattern detector 7a is shown with four stages 801, 802, 802 and 804 driven by output signals S1 through S9, with the output signal from each stage being applied through a corresponding absolute value circuit ABSOL. to comparators 81, 82, 83 and 84. Specifically, stage 801 applies the absolute value of |S4−S6| to the inverting port of comparator 81, with $K_h$ being applied to the non-inverting port. Stage 802 applies the absolute value $|Y_{h2} - Y_{h8}|$ to the non-inverting port of comparator 82, with $K_{yv}$ being applied to the inverting port. Stage 803 applies the absolute value |S2−S8| to the inverting port of comparator 83, with $K_v$ being applied to the non-inverting port. And, stage 804 applies the absolute value:

$$\frac{S1 + 2S4 + S7}{4} - \frac{S3 + 2S6 + S9}{4}$$

to the non-inverting port of comparator 84, with $K_{yh}$ being applied to the inverting port. Output signals from comparators 81, 82, 83 and 84 are applied to a logic stage formed by inverters 85, 86, 87 and 88, AND gates 89, 90, 91 and 92, and OR gates 93, 94, with the output ports of OR gates 93, 94 being respectively coupled to ports A and B of the corresponding multiplexer 53, 72, as previously described herein.

While the invention has been particularly shown and described with reference to a preferred embodiment, it will be understood by those skilled in the art that the horizontal-vertical filter 51 alone can be used without using the horizontal and vertical filters 49, 50 and the pattern detection circuit 7a of FIGS. 4 and 10, and that the horizontal-vertical filter 71 alone can be used without using the horizontal and vertical filters 69, 70 and the pattern detection circuit 7a of FIGS. 6 and 11 without departing from the spirit and scope of the invention.

If the encoding method of the present invention is used at a transmitting site, it is still possible to sustain compatibility with an existing TV system. Furthermore, by applying three dimensional decoding at a receiving site, the quality of an image can be improved dramatically.

As stated above, in a composite image signal encoding circuitry such as TV camera and VTR, the present invention has an advantage in that the best picture quality is sustained at a receiving site by decreasing interference between luminance signal and color signal, shifting the bandwidth of the filters according to still and motion image, and selecting the most effective bandwidth of a filter according to the shape of a pattern.

What is claimed is:

1. A circuit for encoding a composite image signal in a color television having gamma correction matrix means, first and second low pass filters, quadrature phase modulator means and mixer means, comprising:

a luminance signal from said gamma correction matrix means is coupled to an input terminal of first filter means, and color-difference signals from said gamma correction matrix means are coupled to input terminals of said first and second low pass filters;

outputs from said first and second low pass filters are coupled to input terminals of second and third filter means;

a pattern value and a motion value are detected from said luminance signal by pattern and motion detecting means;

the output from said pattern and motion detecting means is applied to said first, second and third filter means;

the output from said first filter means is coupled to said mixer means; and the outputs from said second and third filter means are coupled to said quadrature phase modulator means, and the output of said quadrature phase modulator means is coupled to said mixer means to provide an encoded video signal, and said first, second and third filter means comprise:

first and second clock delay means coupled in series to receive said luminance signal;

first horizontal delay means coupled to receive said luminance signal;

third and fourth clock delay means coupled in series to receive the output of said first horizontal delay means;

second horizontal delay means coupled to receive the output of said first horizontal delay means;

fifth and sixth clock delay means coupled in series to receive the output of said second horizontal delay means;

horizontal filter means coupled to receive the outputs of said first horizontal delay means and said third and fourth clock delay means;

vertical filter means coupled to receive the outputs of said first, third, and fifth clock delay means;

horizontal-vertical filter means coupled to receive the outputs of said first and second horizontal delay means, and said first, second, third, fourth, fifth and sixth clock delay means;

multiplexer means for selecting one the outputs of said vertical, horizontal, and horizontal-vertical filter means according to a first output signal of said pattern and motion detecting means;

first gain controller means for controlling amplitude gains of the output of frame comb filter means;

second gain controller means for controlling amplitude gains of the output of said multiplexer means; and mixer means for mixing the output of said first gain controller means and the output of said second gain controller means according to a second output signal of said pattern and motion detecting means.

2. A circuit for encoding a video signal in a color television having a gamma correction matrix for separating color signals into a luminance signal and color difference signals, a plurality of low-pass filters for providing filtered color difference signals, comprising:

detector means for detecting said luminance signal to provide detected pattern and motion value signals;

first filter means for filtering said luminance signal according to said detected pattern and motion value signals to provide a first intermediate signal;

second plural filter means for filtering the filtered color difference signals according to said detected pattern and motion value signals to provide a plurality of second intermediate signals;

quadrature phase modulator means for modulating said plurality of second intermediate signals according to a chrominance sub-carrier signal and a burst flag signal to provide a third intermediate signal; and mixer means for mixing said first intermediate signal and said third intermediate signal according to a control signal to produce an encoded video signal, and said first filter means comprises:

first and second clock delay means coupled in series for receiving the luminance signal to provide first and second delay signals;

first horizontal delay means for receiving said luminance signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame comb filter means for frame delaying said third delay signal to provide a frame delay signal;

second gain controller means for gain controlling said frame delay signal according to said motion value signal to provide a second gain controlled signal; and mixer means for mixing said first and second gain controlled signals to provide said first intermediate signal.

3. The circuit for encoding a video signal as claimed in claim 2, wherein said detector means comprises:

pattern detector means for detecting intrafield image patterns of said luminance signal to provide said pattern value signal; and motion detector means for detecting interframe differences of said luminance signal to provide said motion value signal.

4. The circuit for encoding a video signal as claimed in claim 2, wherein said multiplexer means selects the horizontal filtered signal when the pattern value signal is indicative of undesired high frequency components in a horizontal direction, the vertical filtered signal when said pattern value signal is indicative of said undesired high frequency components in a vertical direction, and the horizontal-vertical filtered when said pattern value signal is indicative of said undesired high frequency components in both horizontal and vertical directions.

5. The circuit for encoding a video signal as claimed in claim 2, wherein each of said second plural filter means comprises:

first and second clock delay means coupled in series for receiving said filtered color difference signal to provide first and second delay signals;

first horizontal delay means for receiving said filtered color difference signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal, said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame comb filter means for frame delaying said third delay signal to provide a frame delay signal;

second gain controller means for gain controlling said frame delay signal according to said motion value signal to provide a second gain controlled signal; and mixer means for mixing said first and second gain controlled signals to provide said second intermediate signal.

6. The circuit for encoding a video signal as claimed in claim 3, wherein said pattern detector means comprises:

plural comparator means for comparing said first and second horizontal delay signals and said first, second, third, fourth, fifth and sixth delay signals with a plurality of threshold voltages to provide a plurality of compared signals;

plural inverter means for inverting said plurality of compared signals to provide a plurality of inverted compared signals; and logic means for logically combining said plurality of compared signals and said plurality of inverted compared signals to provide said pattern value signal.

7. The circuit for encoding a video signal as claimed in claim 3, wherein said motion detector means comprises:

frame memory means for delaying said luminance signal by one frame to provide a frame delayed luminance signal;

subtractor means for subtracting said frame delayed luminance signal from said luminance signal to provide a frame difference signal;

absolute value means for providing an absolute value signal from said frame difference signal; and motion signal processor means for processing said absolute value signal to provide said motion value signal.

8. A circuit for encoding a video signal in a color television having a gamma correction matrix for separating color signals into a luminance signal and color difference signals, a plurality of low-pass filters for providing filtered color difference signals, comprising:

detector means for detecting the luminance signal to provide detected pattern and motion value signals;

first filter means for filtering said luminance signal according to said detected pattern and motion value signals to provide a first intermediate signal;

quadrature phase modulator means for modulating the filtered color difference signals according to a chrominance sub-carrier signal and a burst flag signal to provide a second intermediate signal;

second filter means for filtering said second intermediate signal according to said detected pattern and motion value signals to provide a third intermediate signal; and mixer means for mixing said first intermediate signal and said third intermediate signal according to a control signal to produce an encoded video signal, and said first filter means comprises:

first and second clock delay means coupled in series for receiving the luminance signal to provide first and second delay signals;

first horizontal delay means for receiving said luminance signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame comb filter means for frame delaying said third delay signal to provide a frame delay signal;

second gain controller means for gain controlling said frame delay signal according to said motion value signal to provide a second gain controlled signal; and mixer means for mixing said first and second gain controlled signals to provide said first intermediate signal.

9. The circuit for encoding a video signal as claimed in claim 8, wherein said detector means comprises:

pattern detector means for detecting intrafield image patterns of said luminance signal to provide said pattern value signal; and motion detector means for detecting interframe differences of said luminance signal to provide said motion value signal.

10. The circuit for encoding a video signal as claimed in claim 8, wherein said multiplexer means selects the horizontal filtered signal when said pattern value signal is indicative of undesired high frequency components in a horizontal direction, the vertical filtered signal when said pattern value signal is indicative of said undesired high frequency components in a vertical direction, and the horizontal-vertical filtered signal when said pattern value signal is indicative of said undesired high frequency components in both horizontal and vertical directions.

11. The circuit for encoding a video signal as claimed in claim 8, wherein said second filter means comprise:

first and second clock delay means coupled in series for receiving the second intermediate signal to provide first and second delay signals;

first horizontal delay means for receiving said second intermediate signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame comb filter means for frame delaying said third delay signal to provide a frame delay signal;

second gain controller means for gain controlling said frame delay signal according to said motion value signal to provide a second gain controlled signal; and mixer means for mixing said first and second gain controlled signals to provide said third intermediate signal.

12. The circuit for encoding a video signal as claimed in claim 9, wherein said pattern detector means comprises:

plural comparator means for comparing the first and second horizontal delay signals and the first, second, third, fourth, fifth and sixth delay signals with a plurality of threshold voltages to provide a plurality of compared signals;

plural inverter means for inverting said plurality of compared signals to provide a plurality of inverted compared signals; and logic means for logically combining said plurality of compared signals and said plurality of inverted compared signals to provide said pattern value signal.

13. The circuit for encoding a video signal as claimed in claim 9, wherein said motion detector means comprises:

frame memory means for delaying the luminance signal by one frame to provide a frame delayed luminance signal;

subtractor means for subtracting said frame delayed luminance signal from said luminance signal to provide a frame difference signal;

absolute value means for providing an absolute value signal from said frame difference signal; and motion signal processor means for processing said absolute value signal to provide said motion value signal.

14. A circuit for encoding a video signal, comprising:

means for receiving a luminance signal and color difference signals;

detecting means for detecting patterns of a frequency spectrum and motion pixels of said luminance signal to provide detected pattern and motion value signals;

first filter means for filtering said luminance signal according to said detected pattern and motion value signals to provide a first intermediate signal;

second plural filter means for filtering said color difference signals according to said detected pattern and motion value signals to provide a plurality of second intermediate signals;

means for modulating said plurality of second intermediate signals according to first control signals to provide a third intermediate signal; and means for mixing said first intermediate signal and said third intermediate signal according to second control signals to produce an encoded video signal, and said first filter means comprises:

first and second clock delay means coupled in series for receiving the luminance signal to provide first and second delay signals;

first horizontal delay means for receiving said luminance signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame comb filter means for frame delaying said third delay signal to provide a frame delay signal;

second gain controller means for gain controlling said frame delay signal according to said motion value signal to provide a second gain controlled signal; and mixer means for mixing said first and second gain controlled signals to provide said first intermediate signal.

15. The circuit for encoding a video signal as claimed in claim 14, wherein said detector means comprises:

pattern detector means for detecting intrafield image patterns of said luminance signal to provide said pattern value signal; and motion detector means for detecting interframe differences of said luminance signal to provide said motion value signal, comprising:

frame memory means for delaying said luminance signal by one frame to provide frame delayed luminance signal;

subtractor means for subtracting said frame delayed luminance signal from said luminance signal to provide a frame difference signal;

absolute value means for providing an absolute value signal from said frame difference signal; and motion signal processor means for processing said absolute value signal to provide said motion value signal.

16. The circuit for encoding a video signal as claimed in claim 14, wherein said multiplexer means selects the horizontal filtered signal when the pattern value signal is indicative of undesired high frequency components in a horizontal direction, the vertical filtered signal when said pattern value signal is indicative of said undesired high frequency components in a vertical direction, and the horizontal-vertical filtered signal when said pattern value signal is indicative of said undesired high frequency components in both horizontal and vertical directions.

17. The circuit for encoding a video signal as claimed in claim 14, wherein each of said second plural filter means comprises:

first and second clock delay means coupled in series for receiving said color difference signals to provide first and second delay signals;

first horizontal delay means for receiving said color difference signals to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal, said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame comb filter means for frame delaying said third delay signal to provide a frame delay signal;

second gain controller means for gain controlling said frame delay signal according to said motion value signal to provide a second gain controlled signal; and mixer means for mixing said first and second gain controlled signals to provide said second intermediate signal.

* * * * *

UNITED STATES PATENT AND TRADEMARK OFFICE
CERTIFICATE OF CORRECTION

PATENT NO. : 5,305,095
DATED : April 19, 1994
INVENTOR(S) : Tong-Ill Song

It is certified that error appears in the above-indentified patent and that said Letters Patent is hereby corrected as shown below:

Column 1, line 67, delete "low" (second occurance):

Signed and Sealed this

Nineteenth Day of August, 1997

BRUCE LEHMAN

*Attest:*

*Attesting Officer*     Commissioner of Patents and Trademarks